2,794,705

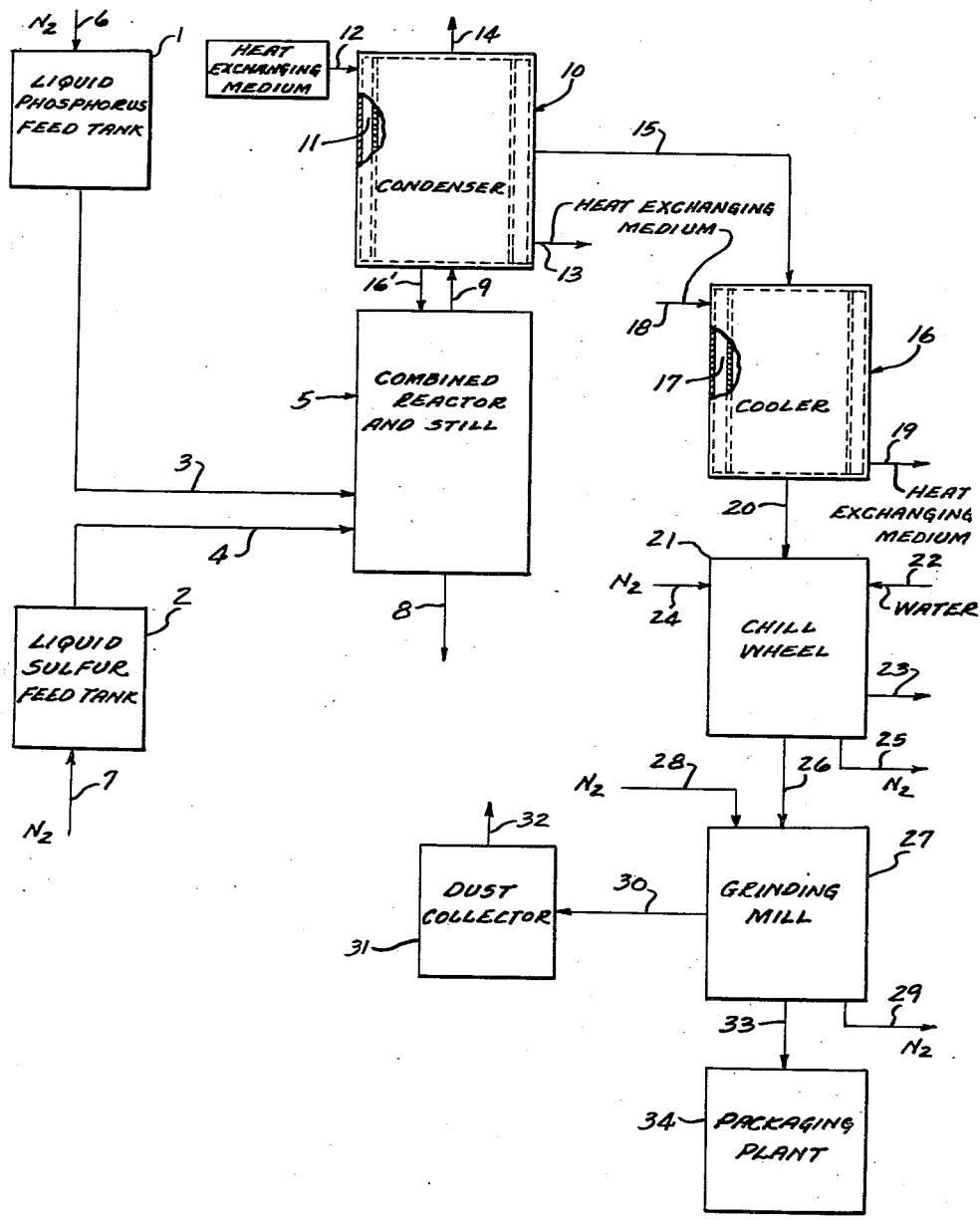

METHOD OF CONTINUOUSLY PRODUCING A PHOSPHORUS SULFIDE

Robert B. Hudson, Trenton, Mich., assignor to Monsanto Chemical Company, St. Louis, Mo., a corporation of Delaware Application July 23, 1954, Serial No. 445,329

6 Claims. (Cl. 23—206)

This invention relates to phosphorus sulfides and to an improved method of producing same.

Heretofore, phosphorus sulfides have been prepared continuously by introducing phosphorus and sulfur with agitation into a molten heel of phosphorus sulfide and reacting these materials in the proportions calculated to yield the desired product. In carrying out this reaction, the exothermic heat is absorbed by the molten heel of phosphorus sulfide and thereby transferred to a suitable heat exchanging material or surface. The product of this reaction is withdrawn continuously from the reaction zone, flaked on chill rolls and then converted into a powder by grinding in a hammer mill or equivalent pulverizing device. This method provides a means of producing phosphorus sulfides continuously but is subject to certain disadvantages which render the method and product commercially unattractive.

For example, in this method the high heat of reaction, high melting temperature and high viscosity of phosphorus sulfides combine to present a very difficult heat transfer problem and consequently a reaction pot with a large heat transfer area is required. Moreover, vigorous mechanical agitation is essential to increase the heat transfer coefficient and to assure efficient mixing and this involves the use of mechanical agitators and seals with their attendant costs. In addition, darkly colored products invariably result from this method as a result of the accumulation of impurities including those derived from the raw materials and metal equipment and while the color of these products may be improved by distillation, such treatment involves additional heat and equipment, all of which add substantially to the overall cost of manufacturing these products. Furthermore, variation from predetermined feed rates in this method yields products of heterogeneous composition due to the inclusion of impurities such as excess phosphorus, sulfur or phosphorus sulfides other than the one desired.

Therefore, it is the primary object of the instant invention to provide a continuous method of producing phosphorus sulfides of uniform composition, which overcomes the disadvantages outlined above. Another object is to provide a continuous method of producing phosphorus sulfides which is more economically and commercially feasible than the above described method. Other objects and advantages of the present invention will become apparent to those skilled in the art as the description proceeds.

I have developed a relatively simple method of manufacturing phosphorus sulfides continuously, which represents a substantial advance in the art over the method described earlier herein. In accordance with this method, phosphorus and sulfur are introduced continuously into a heel of boiling phosphorus sulfide contained in a combined reactor and still wherein the exothermic heat of the phosphorus-sulfur reaction effects continuous distillation of the resulting reaction product. This hot distillate is conveyed continuously to a hot condenser where the phosphorus sulfide vapor is condensed substantially completely while the uncondensed gases and phosphorus sulfide vapors are vented to the atmosphere. The condensed liquid phosphorus sulfide is cooled further and fed continuously onto a chill roll which solidifies and breaks up the product into flakes continuously. If desired, the phosphorus sulfide from the combined reactor and still may be cooled in the condenser to a safe operating temperature and fed continuously onto the chill roll. After leaving the chill roll, the flakes are ground continuously into a powder by means of a hammer mill or another equivalent pulverizing device.

For a more complete understanding of the improved method of making phosphorus sulfides, reference is made to the accompanying flow sheet which constitutes part of the instant specification.

Reference characters 1 and 2 represent phosphorus and sulfur feed tanks from which these reactants are continuously fed by nitrogen pressure via lines 3 and 4, respectively, into a heel of phosphorus sulfide contained in a combined reactor and still 5, the nitrogen used for this purpose being introduced into tanks 1 and 2 by way of lines 6 and 7, respectively.

The combined reactor and still 5 includes a still pot and in communication therewith a packed column containing porcelain Berl saddles, Pyrex glass rings and wool or equivalent materials. This combined reactor and still 5 is provided with an outlet line 8 for discharging still bottoms therefrom and a discharge line 9 for conveying the distilled phosphorus sulfide vapors from the packed column section (not shown) of the still to a hot condenser 10.

The condenser 10 is provided with a jacket 11 having an inlet line 12 for introducing a heat exchanging medium at a temperature of about 300° C. and an outlet line 13 for discharging the heat exchanging medium at a temperature of about 305° C. from the jacket. The condenser is also equipped with a vent line 14 for discharging the inert incondensible gas and traces of phosphorus sulfide from the system, a take-off line 15 for conducting the condensed liquid phosphorus sulfide to a cooler 16; and a line 16' for returning reflux to the combined reactor and still 5.

The cooler 16 is provided with a jacket 17 having an inlet line 18 for introducing a heat exchanging medium at a temperature of about 300° C. and an outlet line 19 for conducting the heat exchanging medium at a temperature of about 305° C. from the jacket 17. In addition, the cooler 16 is equipped with a discharge line 20 for conveying the cooled phosphorus sulfide into an enclosed chill wheel 21.

The chill wheel 21 is cooled by means of water or another suitable medium introduced by line 22 and discharged therefrom by line 23; in addition, in order to avoid combustion of the phosphorus sulfide being flaked, it is blanketed by means of an inert gas such as nitrogen or carbon dioxide which is introduced by line 24 into the enclosure therefor (not shown) and discharged therefrom by means of line 25. This chill wheel 21 is provided with an outlet line 26 through which the flaked phosphorus sulfide is conveyed to a grinding mill 27 where the flakes are ground to a finely divided state.

The grinding mill 27 is purged by means of an inert gas such as nitrogen or carbon dioxide, etc. which enters the mill by line 28 and leaves by line 29, the purging being done as a precautionary measure to avoid combustion of the phosphorus sulfide. This grinding mill is provided with a line 30 for conveying fines to a dust collector 31 from which a portion of the inert purging gas is vented into the atmosphere by line 32. The grinding mill 27 is further provided with a line 33 for conveying the final product to the packaging plant 34.

The following example illustrates the method of carrying out the instant invention employing the system illustrated in the accompanying drawing.

*Example*

The combined reactor and still 5 was charged with about 150 lbs. of phosphorus pentasulfide and then heated to a temperature of about 515° C. so as to provide a fluid heel or reaction medium for the phosphorus-sulfur reaction.

Liquid phosphorus and liquid sulfur, both under nitrogen pressure, were introduced continuously into the above heel of phosphorus pentasulfide at flow rates corresponding to 31 lbs. and 80 lbs., per hour, respectively, said flow rates being sufficient to maintain a reaction temperature of about 515° C. The exothermic heat produced as a result of the reaction between the phosphorus and sulfur caused the resulting phosphorus pentasulfide to distill continuously from the combined reactor and still 5. This distillate including the inert gas was conveyed continuously to the condenser 10 where the phosphorus pentasulfide was cooled to a temperature of about 500° C. and condensed while the inert gas and small amounts of phosphorus pentasulfide were vented by line 14 into the atmosphere. The condensed liquid phosphorus pentasulfide was conducted continuously to the cooler 16 and cooled down to a temperature of about 300° C.–350° C. whereupon it was fed to the chill wheel 21 and converted continuously into flakes. These flakes were conveyed continuously to the grinding mill and converted into a powder at a rate of about 100 lbs. per hour.

The phosphorus pentasulfide thus obtained had a melting point of about 280° C. and a greyish yellow color as contrasted to the substantially jet black color of the phosphorus pentasulfide produced by the low temperature method described earlier herein.

In like manner phosphorus heptasulfide and phosphorus sesquisulfide having an improved color can be produced in a continuous manner by continuously feeding the reactants in the proportions required to yield these products and by operating at a temperature equivalent to the boiling points of the heptasulfide and sesquisulfide, respectively, at the operating pressure.

In the production of phosphorus pentasulfide in accordance with the instant invention, phosphorus and sulfur are continuously fed to a combined reaction and distillation zone where they are reacted together, in a heel of the product to be formed, and at a temperature at least equivalent to the boiling point of the reaction product at the operating pressure. When operating at atmospheric pressure, the reaction temperature used in the formation of phosphorus pentasulfide should fall substantially in the range of about 505° C. to 525° C., whereas in the production of phosphorus sesquisulfide and phosphorus heptasulfide, the reaction temperature should fall within the ranges of from about 400° C. to about 420° C. and from about 520° C. to about 535° C., respectively.

The reactants are introduced continuously into the heel of phosphorus sulfide at a rate producing a reaction temperature at least equivalent to the boiling point of the phosphorus sulfide, thus insuring continuous distillation of this product substantially as rapidly as it is formed. The excess heat developed as a result of this reaction may be absorbed by returning a portion of the condensed phosphorus sulfide to the combined reaction and distillation zone.

The product leaving the combined reaction and distillation zone is cooled to condense the phosphorus sulfide, the temperature used varying with the particular phosphorus sulfide being produced. In the case of phosphorus pentasulfide, the product from the combined reaction and distillation zone is cooled to a temperature of about 500° C. or to a lower temperature above its solidification point to effect substantially complete condensation of the phosphorus pentasulfide.

The condensed phosphorus pentasulfide at a temperature of about 500° C. flows into a cooler where it is cooled to about 300° to 350° C. However, this temperature is not fixed since it varies with the phosphorus sulfide being produced, the only limitation being that the liquid phosphorus sulfide should not be cooled to a temperature preventing free flow thereof onto the chill wheel. This cooling step may be omitted if the product is cooled to a safe operating temperature in the condensation zone.

The liquid phosphorus sulfide is discharged continuously from the condenser or cooler onto a chill wheel and converted into flakes which are introduced continuously into a grinding mill where they are ground to a finely divided state.

The flaking and grinding operations are preferably carried out in the presence of a dry inert atmosphere, but the invention is by no means restricted thereto since this is merely a desirable precautionary measure designed to prevent decomposition of the product by air and moisture.

The products of the instant invention are suitable for use in organic synthesis and in a number of commercial applications such as in the manufacture of extreme pressure lubricants, match compositions and vulcanized rubber.

What I claim is:

1. The method of continuously producing a phosphorus sulfide, which comprises continuously introducing liquid phosphorus and liquid sulfur into a boiling mass consisting of said phosphorus sulfide and thereby effecting a continuous reaction between said phosphorus and said sulfur and continuous distillation of said reaction product, said reactants being introduced continuously into said boiling mass in substantially the proportions calculated to yield said phosphorus sulfide and at a rate maintaining said mass in a boiling condition.

2. The method of continuously producing a phosphorus sulfide selected from the group consisting of phosphorus pentasulfide, phosphorus heptasulfide and phosphorus sesquisulfide, which comprises continuously introducing liquid phosphorus and liquid sulfur into a boiling mass consisting of said phosphorus sulfide and thereby effecting a continuous reaction between said phosphorus and said sulfur and continuous distillation of said reaction product, said reactants being introduced continuously into said boiling mass in substantially the proportions calculated to yield said phosphorus sulfide and at a rate maintaining said mass in a boiling condition.

3. The method of continuously producing a phosphorus sulfide selected from the group consisting of phosphorus pentasulfide, phosphorus heptasulfide and phosphorus sesquisulfide, which comprises continuously introducing liquid phosphorus and liquid sulfur into a boiling mass consisting of said phosphorus sulfide and thereby effecting a continuous reaction between said phosphorus and said sulfur and continuous distillation of said reaction products, and continuously recovering said reaction product, said reactants being introduced continuously into said boiling mass in substantially the proportions calculated to yield said phosphorus sulfide and at a rate maintaining said mass in a boiling condition.

4. The method of continuously producing a phosphorus sulfide selected from the group consisting of phosphorus pentasulfide, phosphorus heptasulfide and phosphorus sesquisulfide, which comprises continuously introducing liquid phosphorus and liquid sulfur into a boiling mass consisting of said phosphorus sulfide and thereby effecting a continuous reaction between said phosphorus and said sulfur and continuous distillation of said reaction product, continuously recovering said reaction product, continuously flaking said recovered reaction product and continuously grinding it into a finely divided state, said reactants being introduced continuously into said boiling mass in substantially the proportions calculated to yield said phosphorus sulfide and at a rate maintaining said mass in a boiling condition.

5. The method of continuously producing phosphorus pentasulfide, which comprises continuously introducing liquid phosphorus and liquid sulfur into a boiling mass consisting of said phosphorus pentasulfide and thereby effecting a continuous reaction between said phosphorus and sulfur and continuous distillation of the phosphorus pentasulfide product, said reactants being introduced continuously into said boiling mass in substantially the atomic ratio of two parts of phosphorus to five parts of sulfur and at a rate maintaining said mass in a boiling condition.

6. The method of continuously producing phosphorus pentasulfide, which comprises continuously introducing liquid phosphorus and liquid sulfur into a boiling mass consisting of said phosphorus pentasulfide and thereby effecting a continuous reaction between said phosphorus and sulfur and continuous distillation of the phosphorus pentasulfide product, said reactants being introduced continuously into said boiling mass in substantially the atomic ratio of two parts of phosphorus to five parts of sulfur and at a rate maintaining the reaction temperature within the boiling range of about 505° C. to about 525° C. at about atmospheric pressure.

References Cited in the file of this patent
UNITED STATES PATENTS
2,569,128   Jones _____ Sept. 25, 1951